US009075264B2

(12) United States Patent
Tanabe

(10) Patent No.: US 9,075,264 B2
(45) Date of Patent: Jul. 7, 2015

(54) DISPLAY DEVICE

(71) Applicant: Funai Electric Co., Ltd., Daito, Osaka (JP)

(72) Inventor: Noritaka Tanabe, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 14/160,803

(22) Filed: Jan. 22, 2014

(65) Prior Publication Data

US 2014/0218661 A1  Aug. 7, 2014

(30) Foreign Application Priority Data

Feb. 5, 2013  (JP) ................................. 2013-020218

(51) Int. Cl.
*G02F 1/1335* (2006.01)
(52) U.S. Cl.
CPC ........ *G02F 1/1336* (2013.01); *G02F 1/133605* (2013.01); *G02F 1/133611* (2013.01)
(58) Field of Classification Search
USPC .......................................................... 349/67
See application file for complete search history.

(56) References Cited

U.S. PATENT DOCUMENTS

| 7,876,398 B2 * | 1/2011 | Fukuda ............................ 349/67 |
| 2003/0002279 A1 | 1/2003 | Fiene |
| 2005/0265020 A1 | 12/2005 | Kim |

FOREIGN PATENT DOCUMENTS

| EP | 2508790 A1 | 10/2012 |
| JP | 2010-49846 A | 3/2010 |

OTHER PUBLICATIONS

Extended European Search Report of the corresponding European Application No. 14153613.6, dated May 12, 2014.

* cited by examiner

*Primary Examiner* — Lucy Chien
(74) *Attorney, Agent, or Firm* — Global IP Counselors, LLP

(57) ABSTRACT

A display device includes a display component, a light source, a rear side support member, and a reflective sheet. The light source is disposed on a rear side of the display device relative to the display component. The reflective sheet includes a bottom face part, a first side face part and a second side face part. The first and second side face parts have first and second protrusions at adjacent end edge portions of the first and second side face parts, respectively. The first protrusion overlaps with the end edge portion of the second side face part from the rear side while the reflective sheet is attached to the rear side support member. The second protrusion overlaps with the end edge portion of the first side face part from the rear side while the reflective sheet is attached to the rear side support member.

11 Claims, 7 Drawing Sheets

DISPLAY DEVICE

CROSS-REFERENCE TO RELATED APPLICATIONS

This application claims priority to Japanese Patent Application No. 2013-020218 filed on Feb. 5, 2013. The entire disclosure of Japanese Patent Application No. 2013-020218 is hereby incorporated herein by reference.

BACKGROUND

1. Field of the Invention

This invention generally relates to a display device. More specifically, the present invention relates to a display device having a reflective sheet for reflecting light from a light source towards a display component.

2. Background Information

Generally, a display device having a reflective sheet for reflecting light from a light source towards a display component is known (see Japanese Unexamined Patent Application Publication No. 2010-49846 (Patent Literature 1), for example).

The above-mentioned Patent Literature 1 discloses a directly backlight device (display device) having a concave (rectangular in plan view) sheet body (e.g., a reflective sheet) that reflects light from a light source toward a liquid crystal cell (e.g., a display component). With this display device, the sheet body is folded so as to include a rectangular bottom face part and four side face parts disposed so as to surround the rectangular bottom face part. More specifically, when the sheet body is spread out flat, slits are formed at the corners of the sheet body (at the boundaries between the four side face parts). The sheet body is formed into a concave shape by folding it so that the end edges of adjacent side face parts contact via these slits.

SUMMARY

However, with the directly backlit device (e.g., the display device) disclosed in Patent Literature 1, slits are formed at the corners of the sheet body (e.g., the reflective sheet) (at the boundaries between the four side face parts). Thus, it has been discovered that even when the sheet body is folded so that the end edges of adjacent side face parts contact via the slits, gaps tend to occur at these contact portions (at the boundary between two side face parts). Therefore, it has been discovered that light from the light source tends to leak through the gaps at the corners of the sheet body, and the gaps at the corners of the sheet body can widen until the overall shape of the sheet body is lost, which decreases the light reflection efficiency and lowers the brightness of the display screen.

One aspect is to provide a display device with which there is less decrease in the brightness of a display screen.

In view of the state of the known technology, a display device is provided that a display device includes a display component, a light source, a rear side support member, and a reflective sheet. The light source is disposed on a rear side of the display device relative to the display component. The light source is configured to irradiate the display component with light from the rear side. The rear side support member supports the light source from the rear side. The reflective sheet is configured to reflect the light from the light source towards the display component. The reflective sheet includes a bottom face part, a first side face part and a second side face part. The bottom face part is disposed on a surface of the rear side support member while the reflective sheet is attached to the rear side support member. The first and second side face parts are disposed about the bottom face part such that the first and second side face parts define a corner of the reflective sheet while the reflective sheet is attached to the rear side support member. The first and second side face parts have first and second protrusions at adjacent end edge portions of the first and second side face parts, respectively. The first protrusion protrudes towards the end edge portion of the second side face part. The second protrusion protrudes towards the end edge portion of the first side face part. The first protrusion overlaps with the end edge portion of the second side face part from the rear side while the reflective sheet is attached to the rear side support member. The second protrusion overlaps with the end edge portion of the first side face part from the rear side while the reflective sheet is attached to the rear side support member.

Also other objects, features, aspects and advantages of the present disclosure will become apparent to those skilled in the art from the following detailed description, which, taken in conjunction with the annexed drawings, discloses one embodiment of the display device.

BRIEF DESCRIPTION OF THE DRAWINGS

Referring now to the attached drawings which form a part of this original disclosure.

DETAILED DESCRIPTION OF EMBODIMENTS

A selected embodiment will now be explained with reference to the drawings. It will be apparent to those skilled in the field from this disclosure that the following descriptions of the embodiment are provided for illustration only and not for the purpose of limiting the invention as defined by the appended claims and their equivalents.

Referring to FIGS. 1 to 8, a liquid crystal television set 100 is illustrated in accordance with one embodiment. The liquid crystal television set 100 is an example of the "display device" of the present invention. In the illustrated embodiment, while the liquid crystal television set 100 is illustrated as an example of the display device, it will be apparent to those skilled in the art from this disclosure that the present invention can be applied to different types of display devices.

Figure 1:
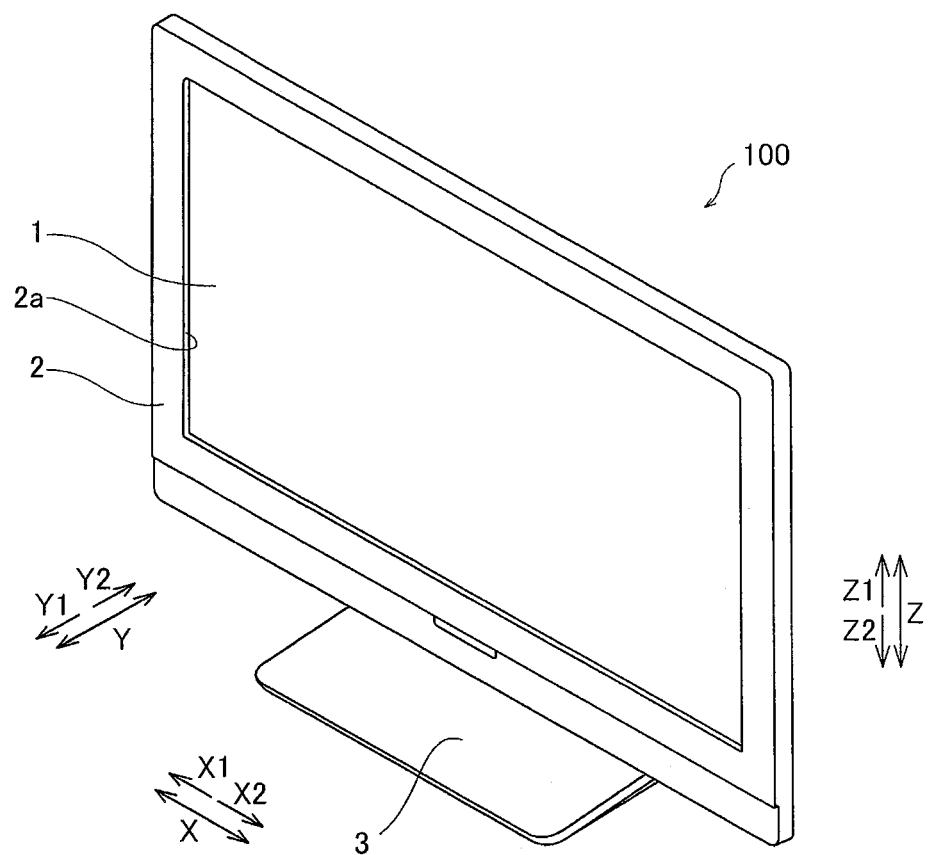
FIG. 1 is a perspective view of the overall configuration of a liquid crystal television set in accordance with one embodiment.
Figure 2:
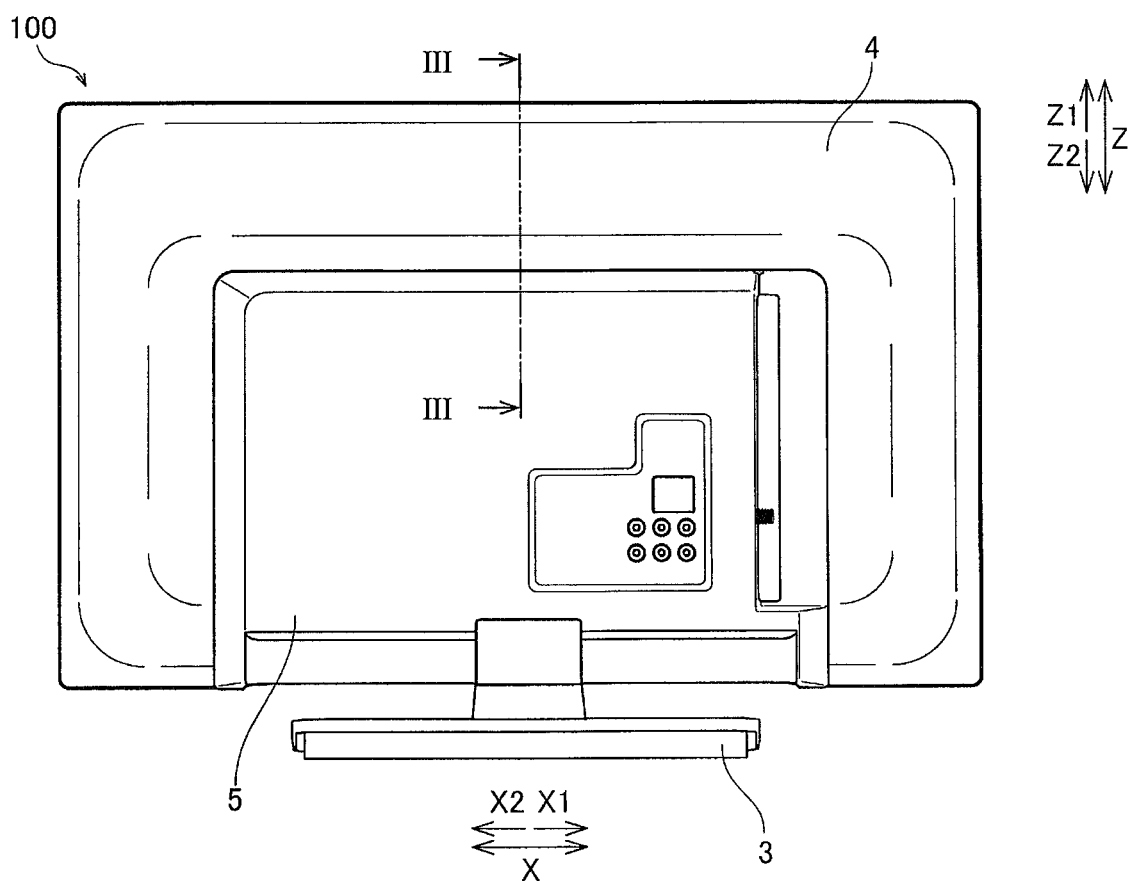
FIG. 2 is a rear elevational view of the liquid crystal television set shown in FIG. 1.
Figure 3:
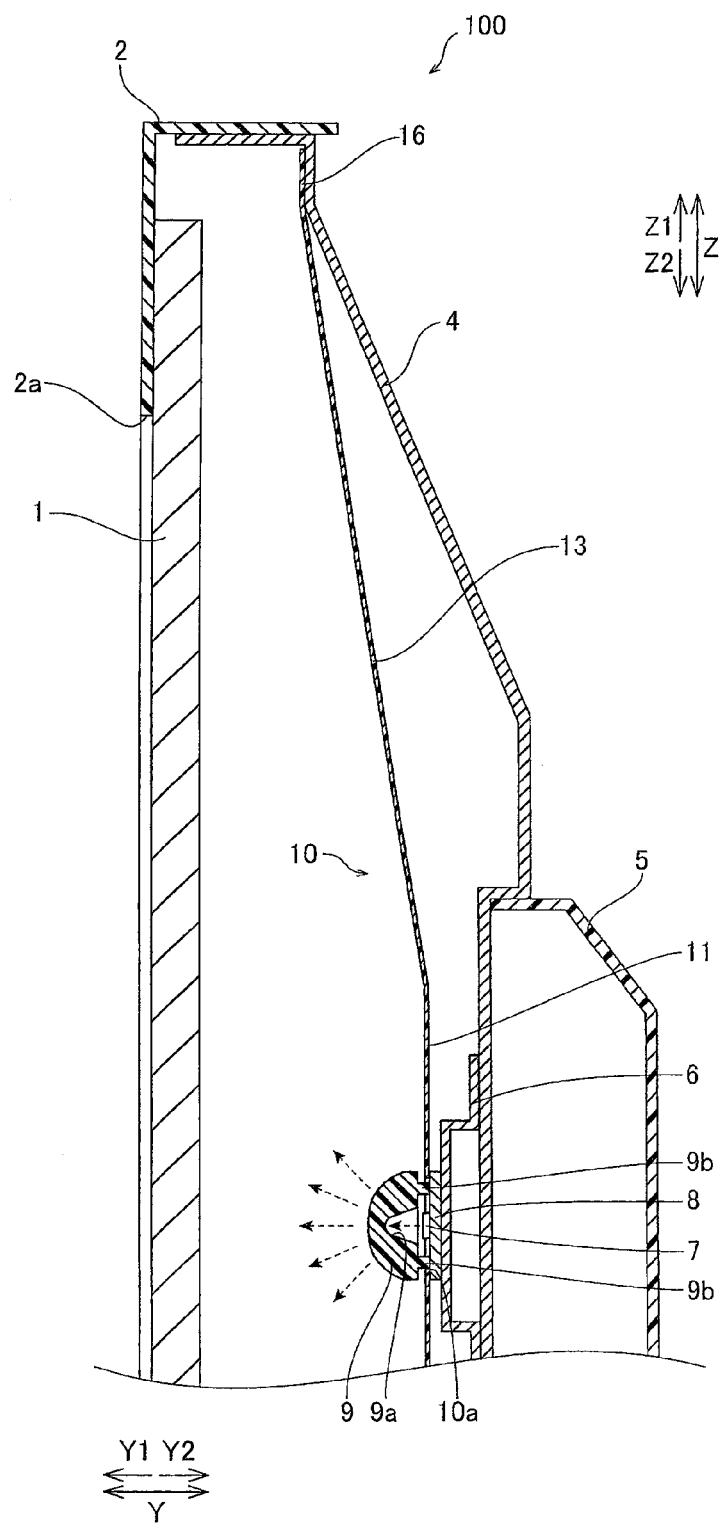
FIG. 3 is an enlarged, partial cross sectional view of the liquid crystal television set shown in FIG. 1, taken along line in FIG. 2.

As shown in FIGS. 1 and 2, the liquid crystal television set 100 includes a display component 1, a front housing 2, and a stand member 3. The display component 1 has liquid crystal cells that display video. In other words, the display component 1 includes a liquid crystal panel. The front housing 2 is made of plastic and supports the display component 1 from the front side (the arrow Y1 direction side). The stand member 3 is made of plastic and supports the liquid crystal television set 100 from below (the arrow Z2 direction side). The front housing 2 is formed in the shape of a frame that is rectangular as seen from the front (as seen from the arrow Y1 direction side). More specifically, a rectangular opening 2a for exposing the display component 1 is provided near the center of the front housing 2. As shown in FIG. 3, the front housing 2 is formed in a concave shape that is recessed forward (the arrow Y1 direction). In the illustrated embodiment, while the display component 1 is illustrated as having liquid crystal cells, it will be apparent to those skilled in the art from this disclosure that the present invention can be applied to different types of display components.

As shown in FIGS. 2 and 3, the liquid crystal television set 100 further includes a rear frame 4 and a plastic cover member 5. The rear frame 4 is made of sheet metal and supports the display component 1 from the rear face side (e.g., the rear side) (the arrow Y2 direction side). This rear frame 4 has a rectangular shape that fits into the rear face side of the front housing 2. Also, the rear frame 4 is formed in a concave shape that is recessed rearward (in the arrow Y2 direction). The rear frame 4 is fixed to the front housing 2 by fastening members (not shown). The cover member 5 has a rectangular shape that is smaller than the rear frame 4. The cover member 5 is attached to the rear face side of the rear frame 4. The cover member 5 is provided so as to cover the various kinds of board (not shown), such as a power supply board or a signal processing board, that are disposed on the rear face of the rear frame 4. The cover member 5 is fixed to the rear frame 4 by fastening members (not shown). The rear frame 4 and the cover member 5 form a rear housing corresponding to the front housing 2. The rear frame 4 is an example of the "rear side support member" of the present invention.

Figure 4:
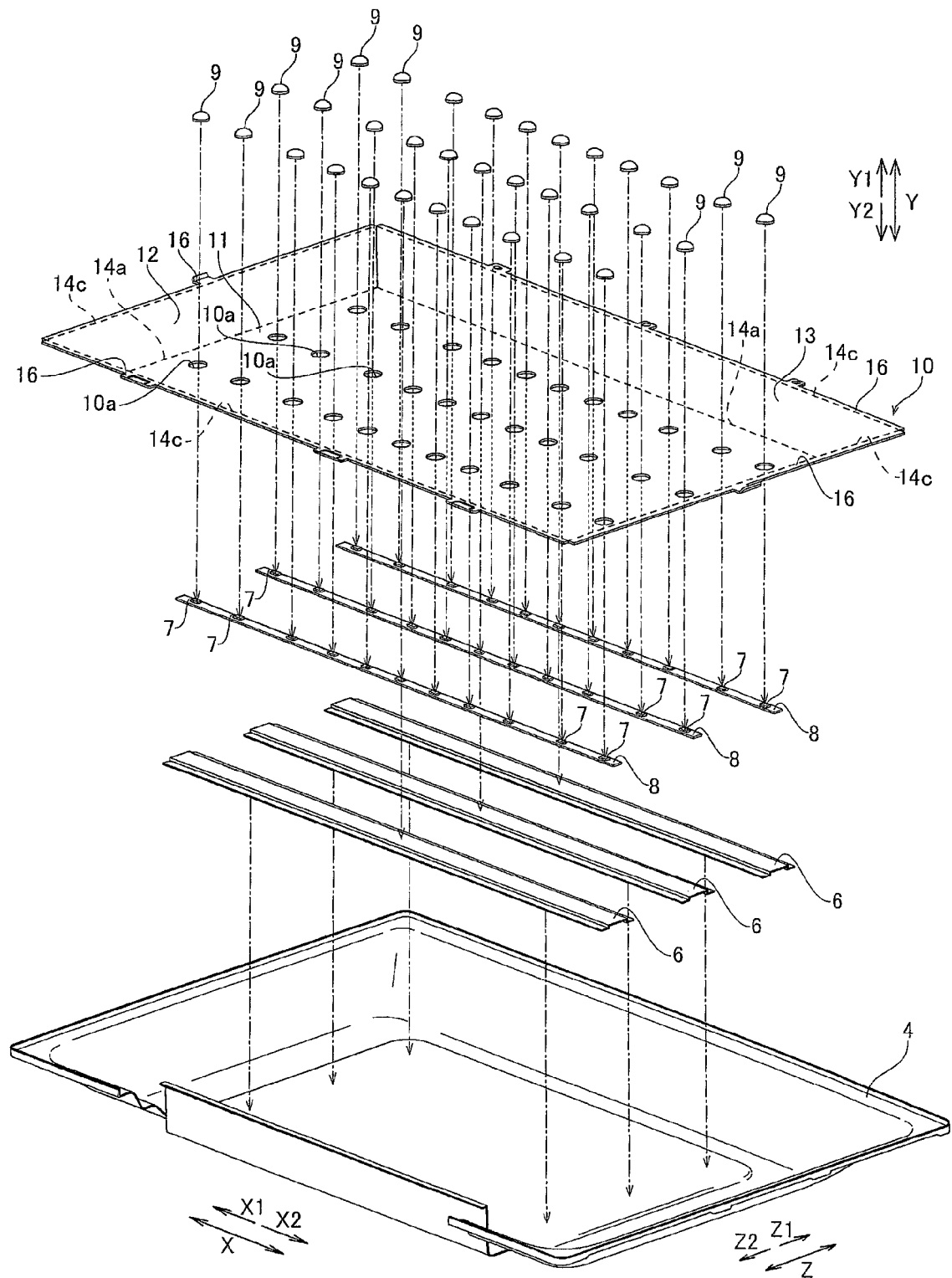
FIG. 4 is an exploded perspective view of the liquid crystal television set shown in FIG. 1, illustrating a rear frame, heat sinks, LED substrates, a reflective sheet, and diffusing lenses of the liquid crystal television set.

As shown in FIGS. 3 and 4, the liquid crystal television set 100 further includes a plurality of (three, for example) sheet metal heat sinks 6, a plurality of light sources 7, a plurality of (three, for example) substrates 8, a plurality of diffusing lenses 9, and a reflective sheet 10. The heat sinks 6 extend in the left and right direction (the X direction). The heat sinks are disposed, spaced apart in the up and down direction (the Z direction), on the surface of the rear frame 4 (the face on the arrow Y1 direction side). The light sources 7 are mounted on the substrates 8, and irradiate the display component 1 with light from the rear face side (the arrow Y2 direction side). The substrates 8 are respectively disposed on the surfaces of these three heat sinks 6. The light sources 7 are made up of LEDs (light emitting diodes) or the like. As shown in FIG. 4, the light sources 7 are mounted on the surface of each of the substrates 8, spaced apart in the direction in which each of the substrates 8 extends (the X direction). In the illustrated embodiment, while the light sources 7 are illustrated as LEDs, it will be apparent to those skilled in the art from this disclosure that the light sources 7 can be different types of light sources.

As shown in FIGS. 3 and 4, the diffusing lenses 9 respectively cover the plurality of light sources 7. The diffusing lenses 9 are attached to the surfaces of the substrates 8 on the side where the plurality of light sources 7 are mounted (the face on the arrow Y1 direction side). These diffusing lenses 9 are made of acrylic or another such plastic, and have the function of diffusing light emitted by the light sources 7 to the display component 1 side (see the dotted arrows in FIG. 3). As shown in FIG. 3, concave components 9a are provided near the center of the bottom face of the diffusing lenses 9 (at positions corresponding to the light sources 7 on the surface of the substrates 8). The diffusing lenses 9 are provided with columnar bosses 9b that extend from the bottom faces of the diffusing lenses 9 to the substrate 8 side. These bosses 9b are adhesively bonded to the surface of the substrates 8, thereby attaching the diffusing lenses 9 at positions corresponding to the light sources 7 on the surface of the substrates 8.

As shown in FIGS. 3 and 4, the reflective sheet 10 reflects light from the light sources 7 to the display component 1 side. The reflective sheet 10 is disposed between the substrates 8 and the diffusing lenses 9. This reflective sheet 10 has a shape that conforms to the rear frame 4 (a concave shape that is recessed to the arrow Y2 direction side) in a state of being disposed on the surface of the substrates 8. Various kinds of optical member (not shown), such as a diffuser for further diffusing light diffused by the diffusing lenses 9 to the display component 1 side, are disposed between the reflective sheet 10 and the display component 1.

Figure 5:
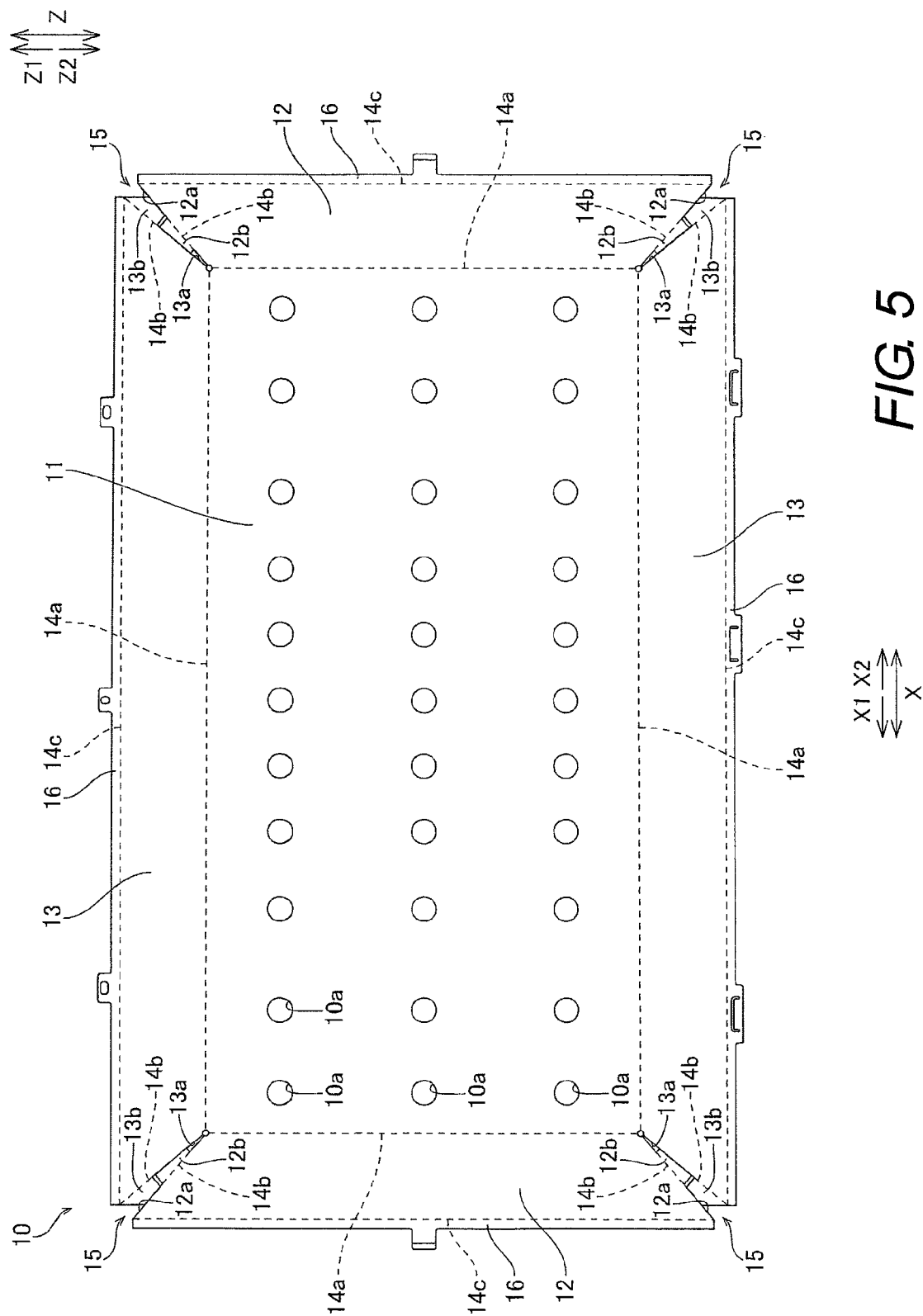
FIG. 5 is a development view of the reflective sheet, illustrating the reflective sheet spread out flat.

As shown in FIGS. 4 to 8, in this embodiment, the reflective sheet 10 is formed by folding a single plastic sheet that is optically reflective. More specifically, the reflective sheet 10 is folded so as to include a rectangular bottom face part 11 and four side face parts (a pair of short side face parts 12 and a pair of long side face parts 13). The bottom face part 11 is disposed on the surface of the rear frame 4 (the face on the arrow Y1 direction side). The four side face parts are disposed so as to surround the four sides of the rectangular bottom face part 11. As shown in FIGS. 4 and 5, a plurality of holes 10a corresponding to the plurality of light sources 7 (diffusing lenses 9) mounted on the surface of the three substrates 8 are formed in the bottom face part 11 of the reflective sheet 10 in a matrix with three rows such that the holes 10a are spaced apart in the up and down direction (Z direction) and the left and right direction (X direction).

As shown in FIG. 5, the bottom face part 11 has a rectangular shape extending in the lengthwise direction (X direction) of the rear frame 4. The pair of short side face parts 12 are connected to the pair of end edges of the bottom face part 11 (the pair of edges extending in the up and down direction (the Z direction) on both sides in the left and right direction (the X direction)). The pair of long side face parts 13 are connected to the pair of long sides of the bottom face part 11 (the pair of edges extending in the left and right direction (the X direction) on both sides in the up and down direction (the Z direction)). Also, perforations 14a, whose openings are closed during formation and do not transmit light, are formed at the boundaries between the bottom face part 11 and the short side face parts 12, and at the boundaries between the bottom face part 11 and the long side face parts 13. The perforations 14a are provided in order to make it easier to fold the reflective sheet 10.

Figure 6:
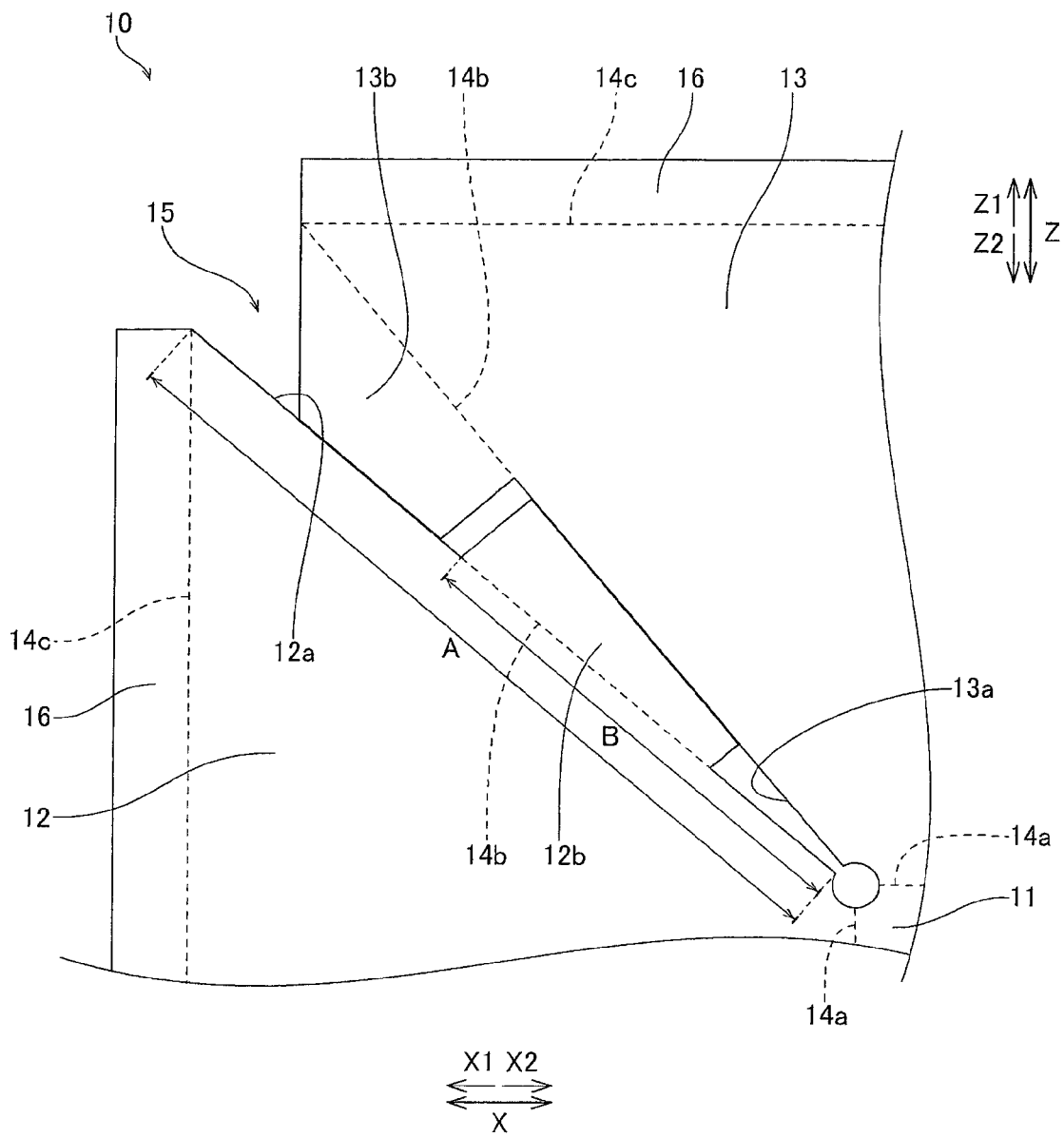
FIG. 6 is an enlarged, partial plan view of the reflective sheet shown in FIG. 5, illustrating a portion of the reflective sheet near a slit.

As shown in FIGS. 5 and 6, the short side face parts 12 and the long side face parts 13 are configured by separating the side face parts of the reflective sheet 10 with separation components 15 provided at the corners (four) of the reflective sheet 10. First protrusions 12b and second protrusions 13b are formed integrally with the end edges 12a and 13a (e.g., the end edge portions) on the separation component 15 side of the short side face parts 12 and the long side face parts 13 such that the first protrusions 12b and the second protrusions 13b extend protruding toward the long side face parts 13 and the short side face parts 12, respectively. The short side face parts 12 and the long side face parts 13 are examples of the "first side face parts" and "second side face parts" of the present invention, respectively.

As shown in FIGS. 5 and 6, the first protrusions 12b and the second protrusions 13b are formed so as to extend along the end edges 12a and 13a on the separation component 15 side of the short side face parts 12 and long side face parts 13, respectively. More specifically, the first protrusions 12b and the second protrusions 13b have a quadrilateral shape extending along the end edges 12a and 13a on the separation component 15 side of the short side face parts 12 and long side face parts 13, respectively. The first protrusions 12b are disposed near the center of the end edges 12a on the separation component 15 side of the short side face parts 12. The second protrusions 13b are disposed at positions other than the positions corresponding to the first protrusions 12b on the end edges 13a on the separation component 15 side of the long side face parts 13 (near the ends of the end edges 13a on the opposite side from the bottom face part 11). Perforations 14b, whose openings are closed during formation and do not transmit light, are formed at the boundaries between the first protrusions 12b and the short side face parts 12, and at the boundaries between the second protrusions 13b and the long side face parts 13.

In this embodiment, as shown in FIG. 6, the length A (e.g., the first dimension) of the end edge 12a on the separation component 15 side of the short side face part 12, and the length B (e.g., the second dimension) along the end edge 12a from the end of the separation component 15 on the bottom face part 11 side to the end of the first protrusion 12b on the opposite side from the bottom face part 11, are set so as to satisfy the following Equations 1 and 2 (e.g., relations (1) and (2)). FIG. 6 is a diagram of when both of the following Equations 1 and 2 are satisfied by having the length A and the length B satisfy the relational formula $(1/2) \times A < B < (2/3) \times A$.

$$(1/3) \times A \leq B \leq (2/3) \times A \qquad (1)$$

$$(1/2) \times A \leq B \leq (2/3) \times A \qquad (2)$$

Figure 7:
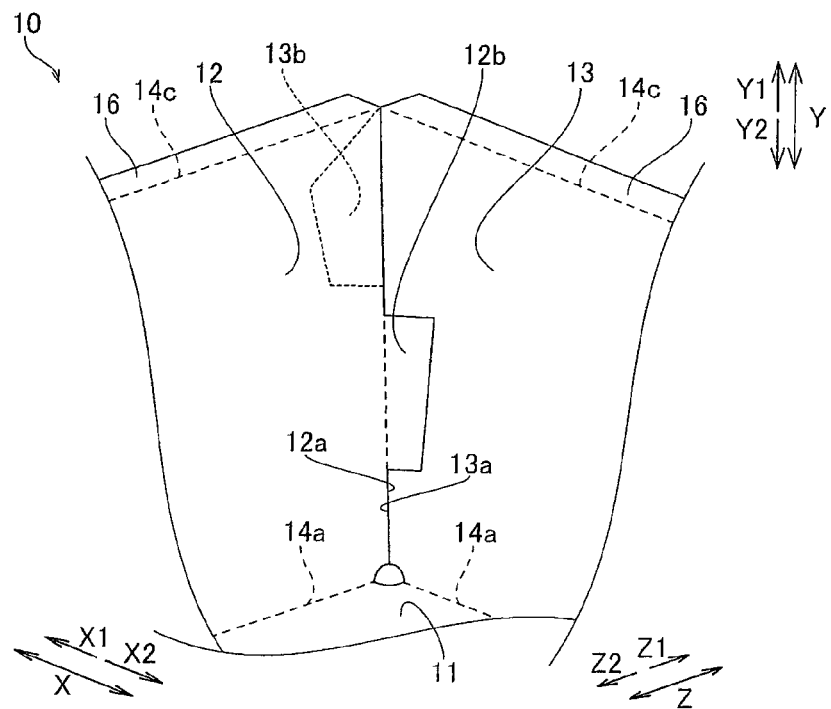
FIG. 7 is an enlarged, partial perspective view of the reflective sheet, illustrating a state before a first protrusion is pushed into a rear face of a long side face part of the reflective sheet.
Figure 8:
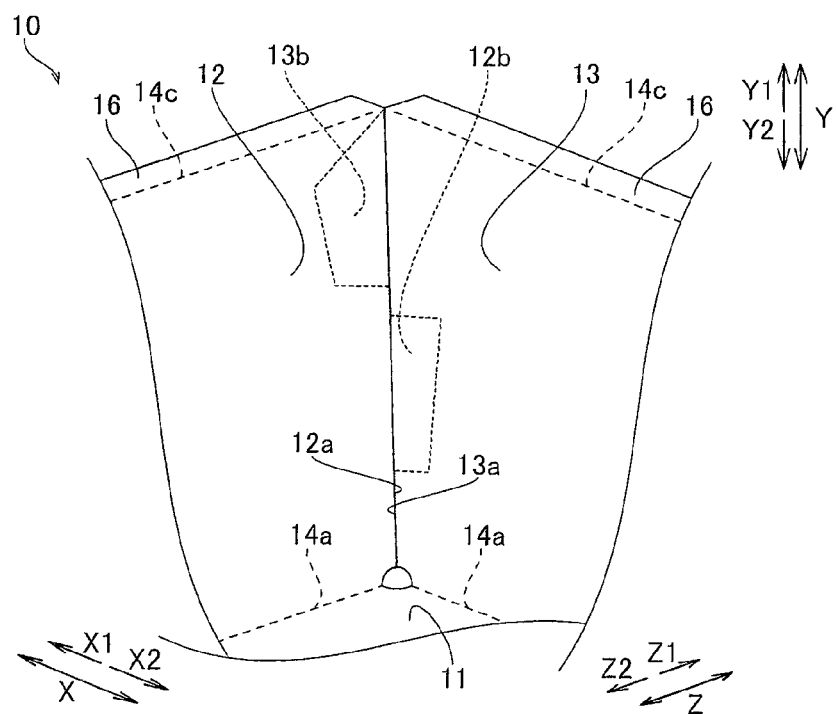
FIG. 8 is an enlarged, partial perspective view of the reflective sheet, illustrating a state after the first protrusion is pushed into the rear face of the long side face part of the reflective sheet.

As shown in FIGS. 7 and 8, in this embodiment, first, the first protrusions 12b of the short side face parts 12 are disposed on the front side (inside) of the long side face parts 13, while the second protrusions 13b of the long side face parts 13 are disposed on the rear side (outside) of the short side face parts 12 (see FIG. 7). Then, the reflective sheet 10 is disposed on the front of the rear frame 4 (see FIG. 4). Furthermore, then, the first protrusions 12b disposed on the front side are pushed in so that they go into the rear side of the long side face parts 13. This causes the first protrusions 12b and the second protrusions 13b to be disposed so that they overlap the long side face parts 13 and the short side face parts 12, respectively, from the rear face side (see FIG. 8). Specifically, as shown in FIG. 8, in this embodiment, the first protrusions 12b and the second protrusions 13b are disposed so that they respectively overlap the area near the end edges 12a and the end edges 13a on the separation component 15 side of the long side face parts 13 and the short side face parts 12 in a state in which the reflective sheet 10 has been folded so as to include the bottom face part 11 and the side face parts (the short side face parts 12 and the long side face parts 13) (a state in which the reflective sheet 10 is formed in a concave shape conforming to the rear frame 4; see FIG. 4).

As shown in FIGS. 4 to 8, ears 16 are formed on the outer peripheral part of the short side face parts 12 and the long side face parts 13 on the opposite side from the bottom face part 11. The ears 16 are attached to the outer peripheral part of the rear frame 4. Perforations 14c for folding the ears 16 outside with respect to the short side face parts 12 and the long side face parts 13 are formed at the boundaries between the ears 16 and the short side face parts 12 and long side face parts 13. These perforations 14c are similar to the above-mentioned perforations 14a and 14b in that their openings are closed during formation, so that they do not transmit light.

Next, the procedure by which the reflective sheet 10 is formed in a concave shape conforming to the rear frame 4 will be described through reference to FIGS. 4, 7, and 8.

First, as shown in FIG. 7, the bottom face part 11 and the side face parts (the short side face parts 12 and the long side face parts 13) of the reflective sheet 10 are folded along the perforations 14a to dispose the first protrusions 12b of the short side face parts 12 on the front side of the long side face parts 13, and to dispose the second protrusions 13b of the long side face parts 13 on the rear side of the short side face parts 12. Then, in this state, the end edges 12a of the short side face parts 12 and the end edges 13a of the long side face parts 13 are brought into contact with each other.

After the reflective sheet 10 thus folded (see FIG. 7) has been disposed on the front of the rear frame 4 (see FIG. 4), the first protrusions 12b disposed on the front side are pushed in so that they go into the rear face of the long side face parts 13. Consequently, as shown in FIG. 8, the reflective sheet 10 is formed in a concave shape that conforms to the rear frame 4 (see FIG. 4) in a state in which the first protrusions 12b and the second protrusions 13b are disposed so as to overlap the long side face parts 13 and the short side face parts 12, respectively, from the rear face side.

As discussed above, in this embodiment, the first protrusions 12b and the second protrusions 13b that extend protruding toward the long side face parts 13 and the short side face parts 12, respectively, are formed on the end edges 12a and 13a on the separation component 15 side of the short side face parts 12 and the long side face parts 13. The first protrusions 12b and the second protrusions 13b are disposed so as to overlap the area near the ends on the separation component 15 side of the long side face parts 13 and the short side face parts 12 in a state in which the reflective sheet 10 has been folded so as to include the bottom face part 11 and the side face parts (the short side face parts 12 and the long side face parts 13) (a state in which the reflective sheet 10 is formed in a concave shape conforming to the rear frame 4; see FIG. 4). Consequently, the gaps at the corners of the reflective sheet 10 (the boundaries between the short side face parts 12 and the long side face parts 13) produced by the separation of the short side face parts 12 and the long side face parts 13 by the separation components 15 are covered by the first protrusions 12b and the second protrusions 13b. Thus, leakage of light irradiating the corners of the reflective sheet 10 can be suppressed. Also, the areas near the end edges 12a and 13a on the separation component 15 side of the short side face parts 12 and the long side face parts 13 are respectively supported by the second protrusions 13b and the first protrusions 12b from the rear face side. Thus, bending of the short side face parts 12 and the long side face parts 13 can be suppressed. This helps prevent the gaps at the boundaries between the short side face parts 12 and the long side face parts 13 from expanding through bending of the short side face parts 12 and the long side face parts 13, which would result in a loss of the overall shape of the reflective sheet 10. As a result, it is less likely that light reflection efficiency will decrease, so it is less likely that the brightness of the display screen will decrease.

Also, in this embodiment, as discussed above, the first protrusions 12b are disposed near the center of the end edges 12a on the separation component 15 side of the short side face parts 12. The second protrusions 13b are disposed at positions other than the positions corresponding to the first protrusions 12b at the end edges 13a on the separation component 15 side of the second side face parts 13 (near the ends of the end edges 13a on the opposite side from the bottom face part 11). Consequently, the area near the end edges 13a on the separation component 15 side of the long side face parts 13 can be stably supported by the first protrusions 12b disposed near the center of the end edges 12a on the separation component 15 side of the short side face parts 12. Thus, it is less likely that the long side face parts 13 will bend and result in a loss of the overall shape of the reflective sheet 10. Specifically, the area near the center of the end edges 13a on the separation component 15 side of the more readily bendable of the short side face parts 12 and the long side face parts 13 (the long side face parts 13 disposed on the long sides of the bottom face part 11) can be stably supported from the rear face side by the first protrusions 12b formed on the less readily bendable of the short side face parts 12 and the long side face parts 13 (the short side face parts 12 disposed on the short sides of the bottom face part 11). Thus, loss of the overall shape of the reflective sheet 10 through bending of the long side face parts 13 can be easily suppressed. Also, interference between the first protrusions 12b and second protrusions 13b when the reflective sheet is folded can be suppressed by disposing the second protrusions 13b at positions other than the positions corresponding to the first protrusions 12b at the end edges 13a on the separation component 15 side of the long side face parts 13. Thus, this also means that loss of the overall shape of the reflective sheet 10 can be suppressed.

Also, in this embodiment, as discussed above, the length A (see FIG. 6) of the end edges 12a on the separation component 15 side of the short side face parts 12, and the length B (see FIG. 6) along the end edges 12a from the end on the bottom face part 11 side of the separation components 15 to the end of the first protrusions 12b on the opposite side from the bottom face part 11 can be set so as to satisfy the following Equations 1 and 2. FIG. 6 is a diagram of when both of the following Equations 1 and 2 are satisfied by having the length A and the length B satisfy the relational formula $(1/2) \times A < B < (2/3) \times A$.

$$(1/3) \times A \leq B \leq (2/3) \times A \quad (1)$$

$$(1/2) \times A \leq B \leq (2/3) \times A \quad (2)$$

If the length A and length B are thus set, the area near the center of the end edges 13a on the separation component 15 side of the long side face parts 13 can be reliably supported by the first protrusions 12b from the rear face side. Thus, loss of the overall shape of the reflective sheet 10 through bending of the long side face parts 13 can be reliably suppressed.

Also, in this embodiment, as discussed above, the first protrusions 12b and the second protrusions 13b are formed so as to extend along the end edges 12a on the separation component 15 side of the short side face parts 12 and the long side face parts 13, respectively. Consequently, the surface area over which the area near the end edges 12a and 13a on the separation component 15 side of the long side face parts 13 and the short side face parts 12, respectively, are supported from the rear face side can be increased by the first protrusions 12b and second protrusions 13b extending along the end edges 12a and 13a on the separation component 15 side of the short side face parts 12 and the long side face parts 13. Thus, loss of the overall shape of the reflective sheet 10 through bending of the short side face parts 12 and the long side face parts 13 can be effectively suppressed.

Also, in this embodiment, as discussed above, the reflective sheet 10 includes the bottom face part 11, the short side face parts 12 having the first protrusions 12b, and the long side face parts 13 having the second protrusions 13b. The reflective sheet 10 is formed so as not to include portions that overlap each other when the sheet 10 is spread out flat (see FIG. 5). This allows the reflective sheet 10 that includes the bottom face part 11, the short side face parts 12 having the first protrusions 12b, and the long side face parts 13 having the second protrusions 13b to be easily formed by punching out a single, large sheet that is optically reflective.

The embodiment disclosed herein is just an example in every respect, and should not be interpreted as being limiting in nature. The scope of the invention being indicated by the appended claims rather than by the above description of the embodiments, all modifications within the meaning and range of equivalency of the claims are included.

For example, in the above embodiment, a liquid crystal television set is used as an example of the display device of the present invention. However, the present invention is not limited to this. Besides a liquid crystal television set, the present invention can also be applied to any normal display device, such as a PC (personal computer) display device.

Also, in the above embodiment, one first protrusion and one second protrusion are formed on each of the short side face parts (e.g., the first side face parts) and the long side face parts (e.g., the second side face parts). However, the present invention is not limited to this. In the present invention, two or more first protrusions can be formed on the short side face parts. Also, two more second protrusions can be formed on the long side face parts. In this case, the positions of the first protrusions on the end edges of the first side face parts are preferably different from the positions of the second protrusions on the end edges of the second side face parts, so that the two or more first protrusions and the two or more second protrusions will not interfere with each other.

Also, in the above embodiment, the first protrusions are formed near the center of the end edges on the separation component side of the short side face parts (e.g., the first side face parts), while the second protrusions are formed near the ends of the end edges on the separation component side of the long side face parts (e.g., the second side face parts) on the opposite side from the bottom face part. However, the present invention is not limited to this. In the present invention, as long as the second protrusions are formed at positions other than the positions corresponding to the first protrusions on the end edges on the separation component side of the long side face parts, the second protrusions can be formed near the ends on the bottom face part side of the end edges on the separation component side of the long side face parts. Also, with the present invention, the positions of the first protrusion at the end edges of the first side face parts and the positions of the second protrusions at the end edges of the second side face parts can be switched around from those in the example given in the embodiment above. Specifically, the first protrusions can be formed near the ends of the end edges on the separation component side of the short side face parts (e.g., the first side face parts) on the opposite side from the bottom face part, while the second protrusions can be formed near the center of the end edges on the separation component side of the long side face parts (e.g., the second side face parts).

Also, in the above embodiment, the length A of the end edges on the separation component side of the short side face parts (e.g., the first side face parts), and the length B along the end edges from the end on the bottom face part of the separation component to the end of the first protrusion on the opposite side from the bottom face part are made to satisfy both the relational formula $(1/3)\times A \leq B \leq (2/3)\times A$ expressed by the above-mentioned Equation 1 and the relational formula $(1/2)\times A \leq B \leq (2/3)\times A$ expressed by the above-mentioned Equation 2 by having the length A and the length B satisfy the relational formula $(1/2)\times A < B < (2/3)\times A$ (see FIG. 6). However, the present invention is not limited to this. In the present invention, the length A and the length B need only satisfy one of the above-mentioned Equations 1 and 2.

Also, in the above embodiment, the first protrusions and the second protrusions are formed so as to extend along the end edges on the separation component side of the short side face parts (e.g., the first side face parts) and the long side face parts (e.g., the second side face parts). However, the present invention is not limited to this. In the present invention, the width of the first protrusions and second protrusions along the above-mentioned end edges can be reduced.

With the display device in accordance with one embodiment, the display device includes a display component, a light source, a rear side support member, and a reflective sheet. The light source is disposed on a rear side of the display device relative to the display component. The light source is configured to irradiate the display component with light from the rear side. The rear side support member supports the light source from the rear side. The reflective sheet is configured to reflect the light from the light source towards the display component. The reflective sheet includes a bottom face part, a first side face part and a second side face part. The bottom face part is disposed on a surface of the rear side support member while the reflective sheet is attached to the rear side support member. The first and second side face parts are disposed about the bottom face part such that the first and second side face parts define a corner of the reflective sheet while the reflective sheet is attached to the rear side support member. The first and second side face parts have first and second protrusions at adjacent end edge portions of the first and second side face parts, respectively. The first protrusion protrudes towards the end edge portion of the second side face part. The second protrusion protrudes towards the end edge portion of the first side face part. The first protrusion overlaps with the end edge portion of the second side face part from the rear side while the reflective sheet is attached to the rear side support member. The second protrusion overlaps with the end edge portion of the first side face part from the rear side while the reflective sheet is attached to the rear side support member.

With this display device, a gap at the corner of the reflective sheet (the boundary between the first side face part and the second side face part) that occur when the first side face part and the second side face part are separated by a separation component are covered by the first protrusion and the second protrusion. Thus, leakage of light irradiating the corner of the reflective sheet can be suppressed. Also, the areas near the end edge portions of the first side face part and the second side face part are supported by the second protrusions and the first protrusions from the rear side, respectively. Thus, bending of the first side face part and the second side face part can be suppressed. This helps prevent the gap at the boundary between the first side face part and the second side face part from expanding through bending of the first side face part and the second side face part, which would result in a loss of the overall shape of the reflective sheet. As a result, it is less likely that light reflection efficiency will decrease, so it is less likely that the brightness of the display screen will decrease.

With the display device, the first protrusion is disposed near a center of the end edge portion of the first side face part. The second protrusion is disposed at a position of the end edge portion of the second side face part other than a position corresponding to the first protrusion. With this configuration, the area near the end edge portion of the second side face part can be stably supported by the first protrusion disposed near the center of the end edge of the first side face part. Thus, there will be even less loss of the overall shape of the reflective sheet through bending of the second side face parts. Also, interference between the first protrusion and second protrusion when the reflective sheet is folded can be suppressed by disposing the second protrusion at the position other than the position corresponding to the first protrusion at the end edge portion of the second side face part. Thus, this also means that loss of the overall shape of the reflective sheet can be suppressed.

In this case, the first side face part is configured such that the following relation (1) is satisfied:

$$(1/3)\times A \leq B \leq (2/3)\times A \qquad (1)$$

where A is a first dimension that is measured along the end edge portion of the first side face part between an inner end of the end edge portion of the first side face part and an outer end of the end edge portion of the first side face part, and B is a second dimension that is measured along the end edge portion of the first side face part between the inner end of the end edge portion of the first side face part and an outer side edge of the first protrusion, with the outer side edge of the first protrusion being disposed farther from the bottom face part than an inner side edge of the first protrusion. If the first and second dimensions A and B are thus set, the area near the center of the end edge portion of the second side face part can be reliably supported by the first protrusion from the rear side. Thus, loss of the overall shape of the reflective sheet through bending of the second side face part can be reliably suppressed. Here, the outer end of the end edge portion is disposed father from the bottom face part than the inner end of the end edge portion.

With this display device, the first side face part is further configured such that the following relation (2) in regards to the first and second dimensions is satisfied:

$$(1/2)\times A \leq B \leq (2/3)\times A \qquad (2).$$

If the first and second dimensions A and B are thus set, the area near the center of the end edge portion of the second side face part can be more reliably supported by the first protrusion from the rear side. Thus, loss of the overall shape of the reflective sheet through bending of the second side face part can be more reliably suppressed.

With the display device, the bottom face part has a rectangular shape with a long side and a short side, with the long side being longer than the short side. The first side face part extends from the short side of the bottom face part. With this configuration, the area near the center of the end edge portion of the more readily bendable one of the first side face part and the second side face part (the second side face part disposed on the long side of the bottom face part, for example) can be stably supported from the rear side by the first protrusion formed on the less readily bendable one of the first side face part and the second side face part (the first side face part disposed on the short side of the bottom face part, for example). Thus, loss of the overall shape of the reflective sheet through bending of the second side face part can be easily suppressed.

With this display device, the second side face part can extend from the long side of the bottom face part.

With the display device, the first and second protrusions extend along the end edge portions of the first and second side face parts, respectively. With this configuration, the surface area over which the area near the end edge portions of the second side face part and the first side face part are supported from the rear side can be increased by the first protrusion and second protrusion extending along the end edge portions of the first side face part and second side face part, respectively. Thus, loss of the overall shape of the reflective sheet through bending of the first side face part and second side face part can be effectively suppressed.

With the display device, the reflective sheet is integrally formed from a sheet material as a one-piece, unitary member. Furthermore, the reflective sheet is configured such that the reflective sheet does not include portions that overlap with each other when the reflective sheet is spread into a flat shape. With this configuration, the reflective sheet that includes the bottom face part, the first side face part having the first protrusion, and the second side face part having the second protrusion can be easily formed by punching out a single, large sheet that is optically reflective.

With the display device, the first and second protrusions are spaced apart from each other with a gap therebetween.

With the display device, the first protrusion is disposed closer to the bottom face part than the second protrusion.

With the display device, as discussed above, a decrease in the brightness of a display screen can be suppressed.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display in an upright position on a horizontal surface. The terms "left" and "right" are used to indicate the "right" when referencing from the right side as viewed from the front side of the display device, and the "left" when referencing from the left side as viewed from the front side of the display device.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only a selected embodiment has been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:

a display component;

a light source disposed on a rear side of the display device relative to the display component, the light source being configured to irradiate the display component with light from the rear side;

a rear side support member supporting the light source from the rear side; and a reflective sheet configured to reflect the light from the light source towards the display component, the reflective sheet including a bottom face part, a first side face part and a second side face part, the bottom face part being disposed on a surface of the rear side support member while the reflective sheet is attached to the rear side support member, the first and second side face parts being disposed about the bottom face part such that the first and second side face parts define a corner of the reflective sheet while the reflective sheet is attached to the rear side support member, the first and second side face parts having first and second protrusions at adjacent end edge portions of the first and second side face parts, respectively, the first protrusion protruding towards the end edge portion of the second side face part, the second protrusion protruding towards the end edge portion of the first side face part, the first protrusion overlapping with the end edge portion of the second side face part from the rear side while the reflective sheet is attached to the rear side support member, the second protrusion overlapping with the end edge portion of the first side face part from the rear side while the reflective sheet is attached to the rear side support member.

2. The display device according to claim 1, wherein
the first protrusion is disposed near a center of the end edge portion of the first side face part, and
the second protrusion is disposed at a position of the end edge portion of the second side face part other than a position corresponding to the first protrusion.

3. The display device according to claim 2, wherein
the first side face part is configured such that the following relation (1) is satisfied:

$$(1/3) \times A \leq B \leq (2/3) \times A \quad (1)$$

where A is a first dimension that is measured along the end edge portion of the first side face part between an inner end of the end edge portion of the first side face part and an outer end of the end edge portion of the first side face part, and B is a second dimension that is measured along the end edge portion of the first side face part between the inner end of the end edge portion of the first side face part and an outer side edge of the first protrusion, with the outer side edge of the first protrusion being disposed farther from the bottom face part than an inner side edge of the first protrusion.

4. The display device according to claim 3, wherein
the first side face part is further configured such that the following relation (2) in regards to the first and second dimensions is satisfied:

$$(1/2) \times A \leq B \leq (2/3) \times A \quad (2).$$

5. The display device according to claim 1, wherein
the bottom face part has a rectangular shape with a long side and a short side, with the long side being longer than the short side, and
the first side face part extends from the short side of the bottom face part.

6. The display device according to claim 5, wherein
the second side face part extends from the long side of the bottom face part.

7. The display device according to claim 1, wherein
the first and second protrusions extend along the end edge portions of the first and second side face parts, respectively.

8. The display device according to claim 1, wherein
the reflective sheet is integrally formed from a sheet material as a one-piece, unitary member.

9. The display device according to claim 8, wherein
the reflective sheet is configured such that the reflective sheet does not include portions that overlap with each other while the reflective sheet is spread into a flat shape.

10. The display device according to claim 1, wherein
the first and second protrusions are spaced apart from each other with a gap therebetween.

11. The display device according to claim 1, wherein
the first protrusion is disposed closer to the bottom face part than the second protrusion.

* * * * *